Nov. 6, 1962    R. R. DAHL ETAL    3,062,992
UNITIZED FLUID CONTROL VALVE
Filed Dec. 8, 1959    2 Sheets-Sheet 1
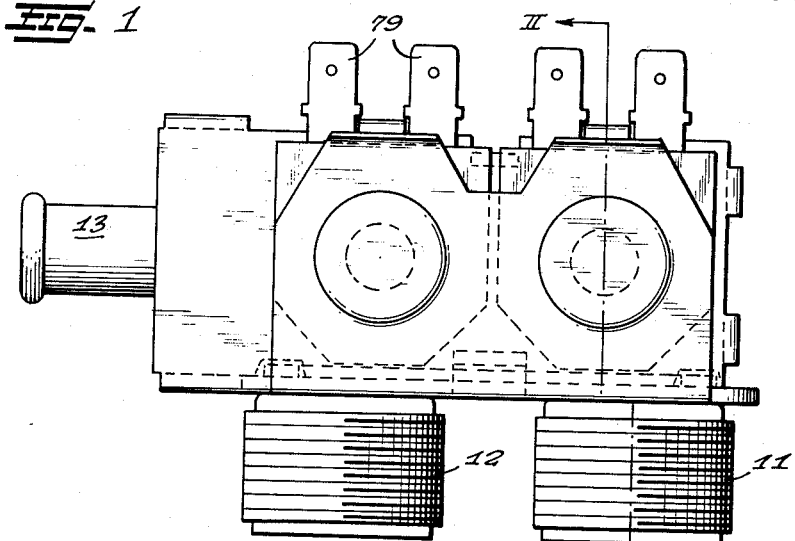
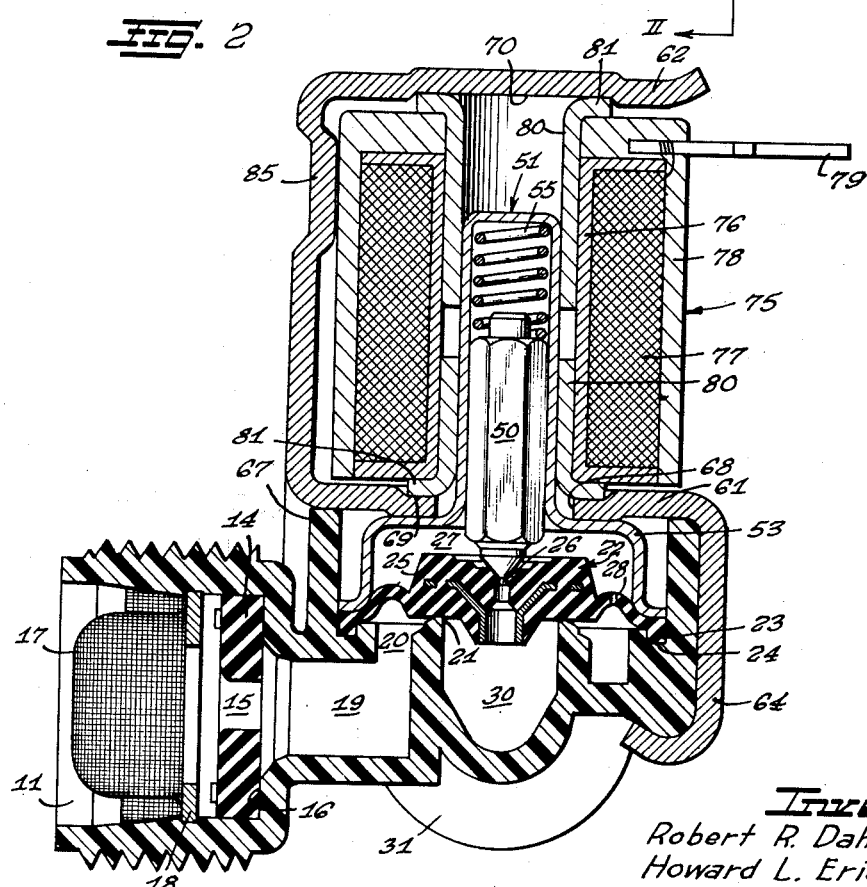
Inventor
Robert R. Dahl
Howard L. Erickson
Fred S. Golden
By Hill, Sherman, Meroni, Gross & Simpson Attys

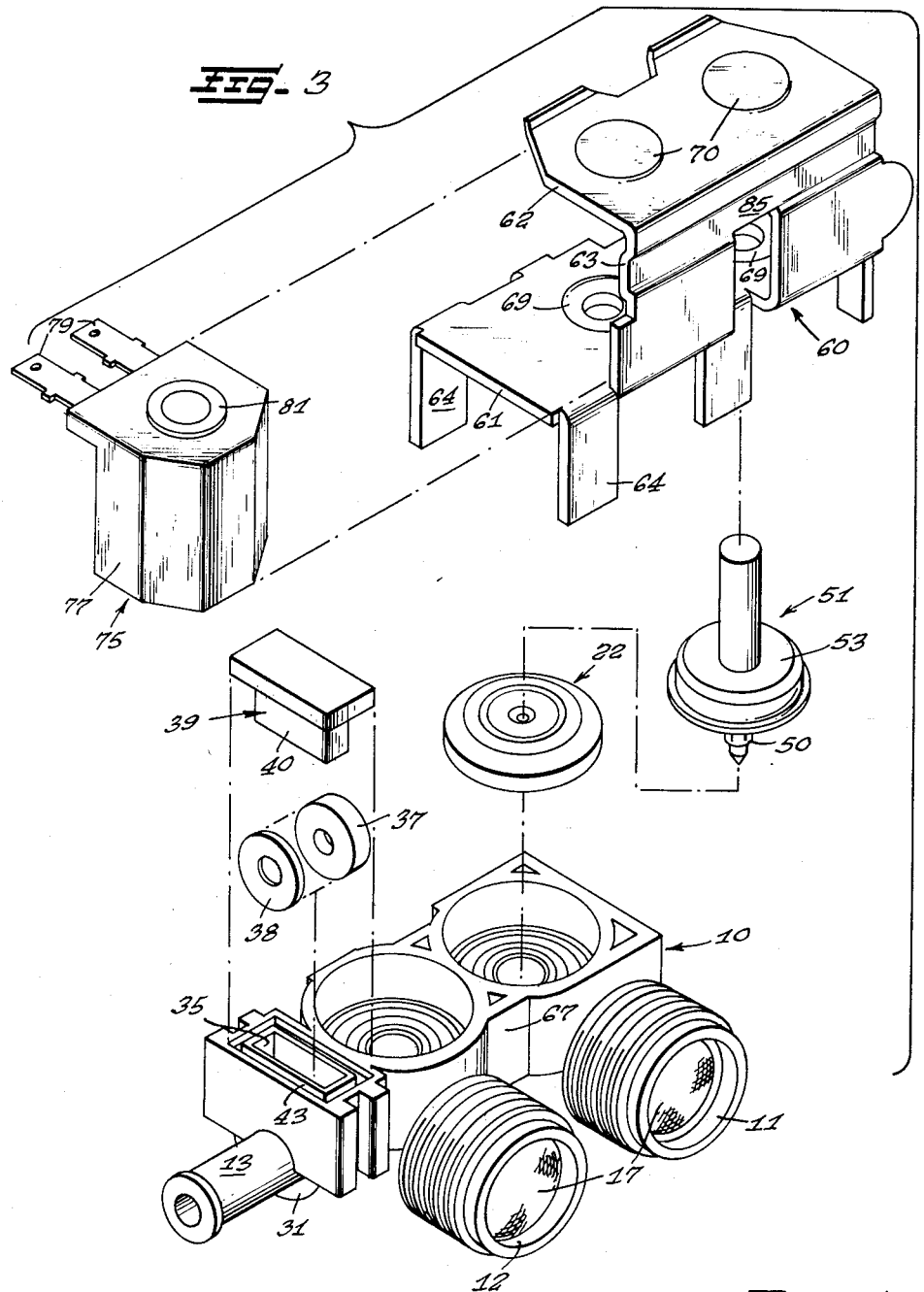

United States Patent Office 3,062,992
Patented Nov. 6, 1962

3,062,992
UNITIZED FLUID CONTROL VALVE
Robert R. Dahl, Lincolnwood, Howard L. Erickson, Bensenville, and Fred S. Golden, Chicago, Ill., assignors to The Dole Valve Company, Morton Grove, Ill., a corporation of Illinois
Filed Dec. 8, 1959, Ser. No. 858,161
5 Claims. (Cl. 317—165)

This invention relates to a fluid control valve of simplified construction and more particularly relates to a solenoid operated fluid control valve having means for readily mounting a solenoid coil and its associated components on a valve body.

The drawings which are appended hereto, illustrate a fluid mixing valve of the type which is adapted to be used in washing machines for controlling the temperature of water directed to the washing machine tub, though the invention might apply as well to a single solenoid fluid control valve for regulating gaseous or liquid flow.

At the present time it is a widespread practice for washing machine manufacturers to repair individual components of malfunctioning fluid mixing or fluid control valves in their washing machines. However, the time necessitated in disassembling, repair, and reassembling such malfunctioning valves is quite great and many of those engaged in fields utilizing such fluid control valves have expressed a desire to those engaged in manufacturing such valves, to provide valves of minimum cost so that, when necessary, malfunctioning valves might simply be replaced by new valves rather than be repaired as has heretofore been the practice.

We have devised a fluid control valve which utilizes the usual fluid pressure operated solenoid controlled diaphragm valve which is of very simple construction and which may be very economically manufactured, thereby fulfilling to a large degree the widespread want.

It will be noted that the entire valve structure is assembled without the use of screws and that many of the parts are positively maintained in proper functional position by frictional engagement with one another. A solenoid mounting bracket is the only element of the structure which requires a final operational step subsequent to assemblage of the valve structure components. The solenoid coil mounting bracket has a plurality of depending legs or fingers which are adapted to be crimped about the valve body.

The solenoid coil mounting bracket has a pair of legs which are spaced apart a distance substantially equal to the axial length of the solenoid coil and each of these legs has coaxially aligned recessed portions formed therein, which are adapted to receive complementary protruding coaxially aligned portions of the solenoid coil so that the coil can simply be snapped into position in the bracket.

It is therefore a principal object of the present invention to provide a simplified fluid control valve which may be readily assembled and economically produced.

A further object of the invention resides in the provision of a solenoid controlled fluid mixing valve wherein the solenoid coil may be snapped into place on a mounting bracket affixed to the valve body, thus eliminating the necessity for screws and like connection members and thereby reducing the labor and thus the cost involved in producing the valve.

A still further object of the invention is directed to a provision of a fluid control valve, wherein all of the interacting parts are maintained in proper functional relation with respect to one another without the necessity of screw means or the like which prolong the time necessary to effect assemblage of the valve.

These and other objects of the invention will appear from time to time as the following specification proceeds and with reference to the accompanying drawings, wherein:

FIGURE 1 is a plan view of a simplified fluid control valve constructed in accordance with the principles of the present invention;

FIGURE 2 is a vertical sectional view through the valve illustrated in FIGURE 1 and taken along lines II—II of FIGURE 1; and FIGURE 3 is an exploded view of the control valve illustrated in FIGURES 1 and 2.

The control valve illustrated in the drawings comprises basically a valve body 10 having hot and cold inlets 11 and 12, respectively, and having an outlet 13. Referring especially to FIGURE 2, a flexible flow control member 14 having a center orifice 15 is mounted within the inlet 11 against a shoulder 16 so that upon increases in pressure of the fluid upstream of the flow control member, the flow control 14 will flex in a downstream direction to thereby decrease the size of the center orifice to maintain a substantially constant flow rate downstream thereof in the manner which is well known in the art. A filter screen 17 is also mounted within the inlet 11 to filter foreign particles from the water entering the valve and is spaced from the flow control 14 by means of a snap ring 18 or the like. It will, of course, be understood that the brief explanation here given of the passage of fluid through the inlet 11 to the outlet 13 would suffice as well for the passage of cold fluid through the inlet 12.

Downstream of the flow control 14 is a flow passage 19 which is in constant open communication with an annular passage 20 formed about a cylindrical outlet port 21.

A flexible annular diaphragm 22 has a peripheral bead 23 which is seated within an annular groove 24 formed about the passage 20 and has central thickened portion 25 which is cooperable with the port 21 to control fluid flow therethrough. A center passage 26 serves to communicate fluid from a chamber 27 formed above the diaphragm to the outlet port 21. A bleed port 28 is also formed within the diaphragm 22 but is disposed adjacent the periphery of the diaphragm so as to communicate fluid from the inlet passage 20 to the chamber 27. The port 28 has a smaller flow area than the central orifice 26 so that when each of the ports are open fluid will flow from the chamber 27 to the outlet port 21 faster than it will flow to the chamber 27 from the inlet passage 20.

Such fluid operated solenoid controlled diaphragm valves are now widely accepted in the valve art and operate on the following principles. When the central port 26 is closed, fluid will flow from the inlet 20 to the chamber 27 thereby creating a differential fluid force on the opposite sides of the diaphragm 22 to maintain the diaphragm in a seated position with respect to the port 21. If the diaphragm 22 is initially in an unseated position such fluid force differential will still exist since the fluid communicated to the chamber 27 will have the same fluid pressure as that within the annular inlet passage 20 at the peripheral edge of the diaphragm 22, whereas the pressure on the undersurface of the diaphragm will not be as great due to the fact that a vortex is created about the outlet port 21 thus lessening fluid pressure at the central portion of the undersurface of the diaphragm. As a result, closure of the center passage 26 will act to effect seating of the diaphragm 22 by fluid pressure means. The diaphragm 22 can be unseated from the port 21 merely by opening communication between the chamber 27 and port 21 through the passage 26. Since the flow area of passage 26 is greater than the flow area of the port 28, fluid will flow from the chamber 27 faster than it will flow into the chamber, and fluid pressure acting on the undersurface of the diaphragm 22 will act to force the diaphragm to an open position.

The outlet port 21, it will be observed, communicates with an outlet passage 30 which emerges to a flow control housing 31, constituting a diametrically enlarged portion thereof and which thereafter opens to the outlet 13.

Referring especially to FIGURE 3, in conjunction with FIGURE 2, it will be understood that the flow control housing 31 is approximately semi-circular in transverse cross section and that it opens to a rectangularly shaped entry port 35 formed in the valve body 10. The entry port 35 has a width at least as great as that of the interior of the flow control housing 31 so that a flow control 37 and its respective seat 38 can be dropped into the housing 31 through the entry port 35. The inner diameter of the semi-circular housing 31 is only slightly greater than the outer diameter of the flow control 37 and its respective seat 38 so that the latter mentioned members will be seated in proper functional relation within the housing 31. Subsequent to insertion of members 37 and 38 a fluid tight plug 39 is fitted into the entry port 35 to prevent the leakage of fluid therefrom. The plug 39 has a depending lug 40 which is adapted to be disposed in engagement with or in juxtaposition to the flow control 37 to maintain that member and its respective seat in its proper position. A depending peripheral flange is formed about the upper end of the plug 39 which is adapted to be frictionally received within a complementary channel groove 43 formed about the entry port 35.

Referring once again, more particularly, to FIGURE 2, an armature 50 is adapted to control fluid flow through the central port 26 in diaphragm 22 and is mounted for axial sliding movement within an armature guide 51. The armature guide 51 is closed at its upper end portion but has a diametrically enlarged base portion 53 which is adapted to seat upon the peripheral edge of the diaphragm 22 to maintain the peripheral bead 23 thereof in proper seated relation in the groove 24. A return spring 55 is mounted within the upper end of the guide 51, having one end seated against the closed end of the guide and having its opposite end seated against the armature 50 so that when the guide 51 is seated upon the diaphragm 22 the armature 50 will be biased into a position to shut off fluid flow through the central port 26.

As shown most clearly in FIGURES 2 and 3 a solenoid coil mounting bracket or mount 60 is formed of metal and has a base leg 61 and an upper leg 62 which are formed integrally with one another and which are joined by a side wall 63. The bracket 60 has a plurality of depending lugs 64 formed integrally therewith which are adapted to be crimped over the edge of the valve body 10 as shown in FIGURE 2.

The base leg 61 rests, at its opposite longitudinal edges, on an upstanding wall 67 which is formed integrally with the valve body 10 and has apertures 68 formed therein which are adapted to receive the upstanding guides 51. It will be noted that the base leg 61 has recesses 69 formed therein coaxially with the apertures 68 and that the undersides of these recesses engage the horizontally extending annular portions of the guides 51 to maintain the guides in engagement with the peripheral edges of the diaphragms 22. The depending fingers 64 are curled over the side walls of the valve body 10 and upwardly against the lower surface thereof to firmly seat the bracket 60 on the valve body.

The upper leg 62 also has a pair of recesses 70 formed therein which are coaxially aligned with the recesses 69 and these recesses cooperate to form a means for securing a solenoid coil 75 on the bracket 60.

The solenoid coil 75 comprises a spool 76 which has a coil 77 wound therearound and which has a protective jacket 78 formed about the outer surface thereof within which is secured a plurality of electrical connecting tabs 79 which, in turn, are electrically connected to opposite ends of the coil 77.

As shown especially in FIGURE 2 a pair of inserts 80 having outturned flanges 81 are fitted within the hollow interior of the spool 76 and have inner diameters which substantially conform to the outer diameter of the upstanding guide portion of the armature guide 51.

It will be observed that prior to fitting of the bracket 60 over the guide 51, a solenoid coil 75 may be snapped into the bracket 60 between the legs 61 and 62, and that, when the protruding flanged portions 81 of the inserts 80 snap into the recesses 69 and 70, the solenoid coil will be firmly maintained in its proper functional position. In order to facilitate insertion of the solenoid coil 75 into the bracket 60 in the foregoing manner, the sidewall 63 is channeled as at 85 so that the solenoid coil 75 may be more readily properly positioned in the bracket 60.

Assemblage of the fluid control valve might thus be accomplished in the following manner:

Initially, the seat 38 and the flow control member 37 might be dropped into the flow control housing 31 and the plug 39 thereafter inserted in the entry port 35 while placement of the filter screens 17 could be effected during the same operation. Thereafter, the diaphragm 22 might be dropped into place in their respective wells and the guide 51, armature 50, and spring 55 thereafter assembled and dropped onto the peripheral edges of the diaphragms within the wells. The solenoid coils 75 will be slid onto the bracket 60 between the upper and lower legs 61 and 62 and the solenoid coil mount 60 with each of the solenoids mounted therein could thereafter be dropped onto the valve body 10 with the guides 51 received within apertures 68 and thereafter the fingers 64 may be crimped over the lower edges of the valve body 10.

A flow control unit would thus be completely assembled with a minimum of labor and without necessitating the use of screws, rivets, or other similar securing means.

It will be understood that this embodiment of the invention has been used for illustrative purposes only and that various modifications and variations in the invention might be effected without departing from the spirit and scope of the novel concepts thereof.

We claim as our invention:

1. A solenoid coil mount for a solenoid coil comprising a resiliently deformable bracket having a pair of legs spaced apart a distance approximately equal to one dimension of the solenoid coil, opposed recesses within said legs, and complementary protruding elements extending from opposite ends of the solenoid coil along said one dimension thereof receivable within said recesses to mount said coil within said bracket.

2. A solenoid coil mount for a solenoid coil comprising a resiliently deformable bracket having a pair of legs spaced apart a distance equal to one dimension of said solenoid coil, a recess formed within at least one of said legs, and a complementary protruding element extending from one end of said coil along said one dimension thereof receivable within said recess to mount said coil within said bracket.

3. A solenoid coil mount for mounting a solenoid coil on a housing comprising a deformable bracket having a pair of legs spaced apart a distance approximately equal to one dimension of the solenoid coil, opposed recesses within said legs, complementary protruding elements extending from opposite ends of the solenoid coil along said one dimension thereof receivable within said recesses to mount said coil within said bracket, and means for mounting said bracket on the housing comprising at least one element formed integrally with said bracket which is crimped about a portion of the housing.

4. A solenoid coil mount for mounting a solenoid coil on a housing comprising a deformable bracket having a pair of legs spaced apart a distance approximately equal to one dimension of the solenoid coil, a recess formed in at least one of said legs, a complementary protruding element extending from one end of the coil along said one dimension thereof receivable within said recess to positively mount the coil within the said bracket, and means for mounting said bracket on the housing comprising at least one element formed integrally with said bracket which is crimped about a portion of the housing.

5. A solenoid coil mount for mounting a solenoid coil on a housing comprising a deformable bracket having a pair of legs spaced apart a distance approximately equal to one dimension of the solenoid coil, a recess formed in at least one of said legs, a complementary protruding element extending from one end of the coil along said one dimension thereof receivable within said recess to mount the coil within the said bracket, and a plurality of elements formed integrally with said bracket and crimped about a portion of the housing for mounting said bracket to the housing.

References Cited in the file of this patent

UNITED STATES PATENTS

| | | |
|---|---|---|
| 2,333,448 | Seeley | Nov. 2, 1943 |
| 2,619,986 | Goepfrich | Dec. 2, 1952 |
| 2,651,744 | Acklin | Sept. 8, 1953 |
| 2,888,234 | Dahl | May 26, 1959 |
| 2,909,354 | Bingham | Oct. 20, 1959 |
| 2,914,086 | Beller | Nov. 24, 1959 |